(12) United States Patent
Kawaguchi et al.

(10) Patent No.: US 6,448,959 B1
(45) Date of Patent: *Sep. 10, 2002

(54) DESIRED REGION SPECIFYING SYSTEM IN AN IMAGE EDITING APPARATUS

(75) Inventors: Naohisa Kawaguchi; Yasuhiro Iijima; Kazumi Saito, all of Kawasaki (JP)

(73) Assignee: Fujitsu, Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 82 days.

(21) Appl. No.: 08/353,375

(22) Filed: Dec. 2, 1994

Related U.S. Application Data

(63) Continuation of application No. 07/992,967, filed on Dec. 11, 1992, now abandoned.

(30) Foreign Application Priority Data

Dec. 31, 1991 (JP) .............................................. 3-330199

(51) Int. Cl.[7] .................................................. G09G 5/00
(52) U.S. Cl. ....................................... 345/173; 345/345

(58) Field of Search ................................. 340/706, 707, 340/708, 709, 710, 711, 712, 721, 723; 178/18, 19, 20; 345/113, 114, 115, 118, 119, 120, 156, 157, 173, 179, 116

(56) References Cited

U.S. PATENT DOCUMENTS

| | | | | |
|---|---|---|---|---|
| 4,263,592 A | * | 4/1981 | Takahashi et al. | 340/706 |
| 4,710,595 A | * | 12/1987 | Kimura | 178/18 |
| 4,723,209 A | * | 2/1988 | Hernandez et al. | 345/110 |
| 4,965,558 A | * | 10/1990 | Saki et al. | 340/723 |
| 5,237,647 A | * | 8/1993 | Roberts et al. | 340/706 |

FOREIGN PATENT DOCUMENTS

| | | |
|---|---|---|
| JP | 63-14229 | 1/1988 |
| JP | 2-231626 | 9/1990 |
| JP | 2-310722 | 12/1990 |

* cited by examiner

*Primary Examiner*—Chanh Nguyen
(74) *Attorney, Agent, or Firm*—Armstrong, Westerman & Hattori, LLP

(57) ABSTRACT

A desired region specifying system in an image editing apparatus in which a region selecting information is an analog signal generated from, for example, a pressure sensor provided in a stylus pen, for selecting the regions from overlapping regions.

24 Claims, 19 Drawing Sheets

Fig.3

TABLE 27

| ID | REGION PARAMETER |
|---|---|
| 1 | REAR-MOST |
| 2 | ONE REGION ABOVE |
| 3 | TWO REGIONS ABOVE |
|  |  |
|  |  |
|  |  |
| N | FRONT-MOST REGION |

Fig.5

TABLE 24
M: NUMBER

| ID |  |
|---|---|
| 2 | REAR-MOST REGION |
| 7 | ONE REGION ABOVE |
| 15 | TWO REGION ABOVE |
|  |  |
|  |  |
|  |  |
| X | FRONT-MOST REGION |

NUMBER OF REGIONS IS M

Fig.4

DETAIL OF REGION PARAMETER

| ITEM | CONTENT |
|---|---|
| X START POINT | LEFT-MOST X COORDINATE OF REGION |
| Y START POINT | UPPER-MOST Y COORDINATE OF REGION |
| X END POINT | RIGHT-MOST X COORDINATE OF REGION |
| Y END POINT | LOWER-MOST Y COORDINATE OF REGION |
| REGION WIDTH WHEN FORMED | WIDTH OF REGION WHEN FORMED |
| REGION LENGTH WHEN FORMED | LENGTH OF REGION WHEN FORMED |
| INCREMENT IN X DIRECTION | WIDTH OF CURRENT REGION (INCREMENT FROM FORMED TIME) |
| INCREMENT IN Y DIRECTION | LENGTH OF CURRENT REGION (INCREMENT FROM FORMED TIME) |
| ROTATION ANGLE | ROTATION ANGLE OF CURRENT REGION (INCREMENT FROM FORMED TIME) |
| UPDATE FLAG FOR TRANSPARENCY | REPRESENTING WHETHER TRANSPARENCY HAS BEEN CHANGED |
| SELECTION FLAG | REPRESENTING WHETHER THE REGION IS CURRENTLY SELECTED |
| PIXEL DATA | ADDRESS OF PIXEL DATA OF REGION STORED IN DATA STORAGE |
| TRANSPARENCY DATA | ADDRESS OF TRANSPARENCY DATA OF REGION STORED IN DATA STORAGE |
| PIXEL DATA WHEN FORMED | ADDRESS OF PIXEL DATA OF REGION STORED IN DATA STORAGE WHEN FORMED |
| TRANSPARENCY DATA WHEN FORMED | ADDRESS OF TRANSPARENCY DATA OF REGION STORED IN DATA STORAGE WHEN FORMED |

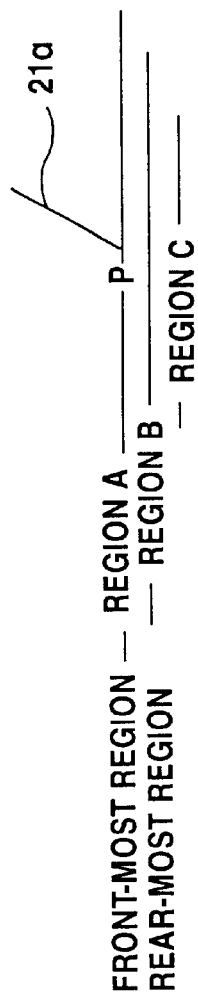
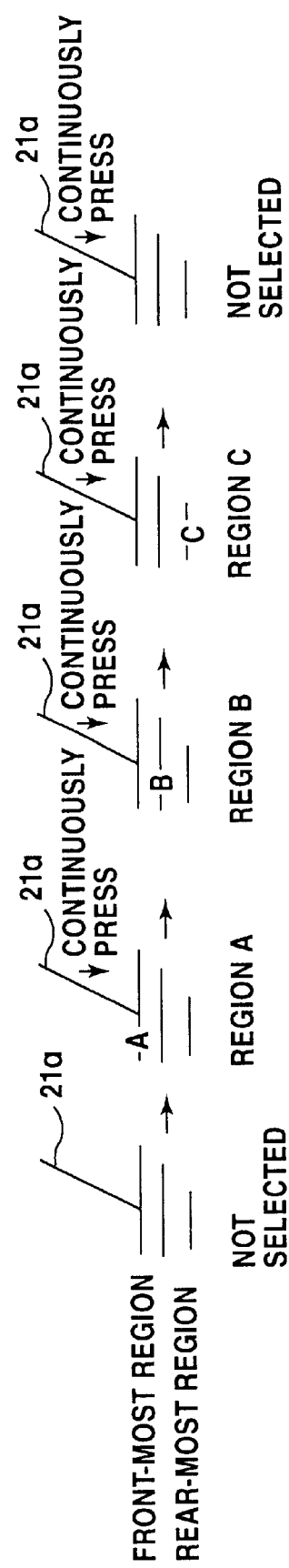
Fig.7A
Fig.7B

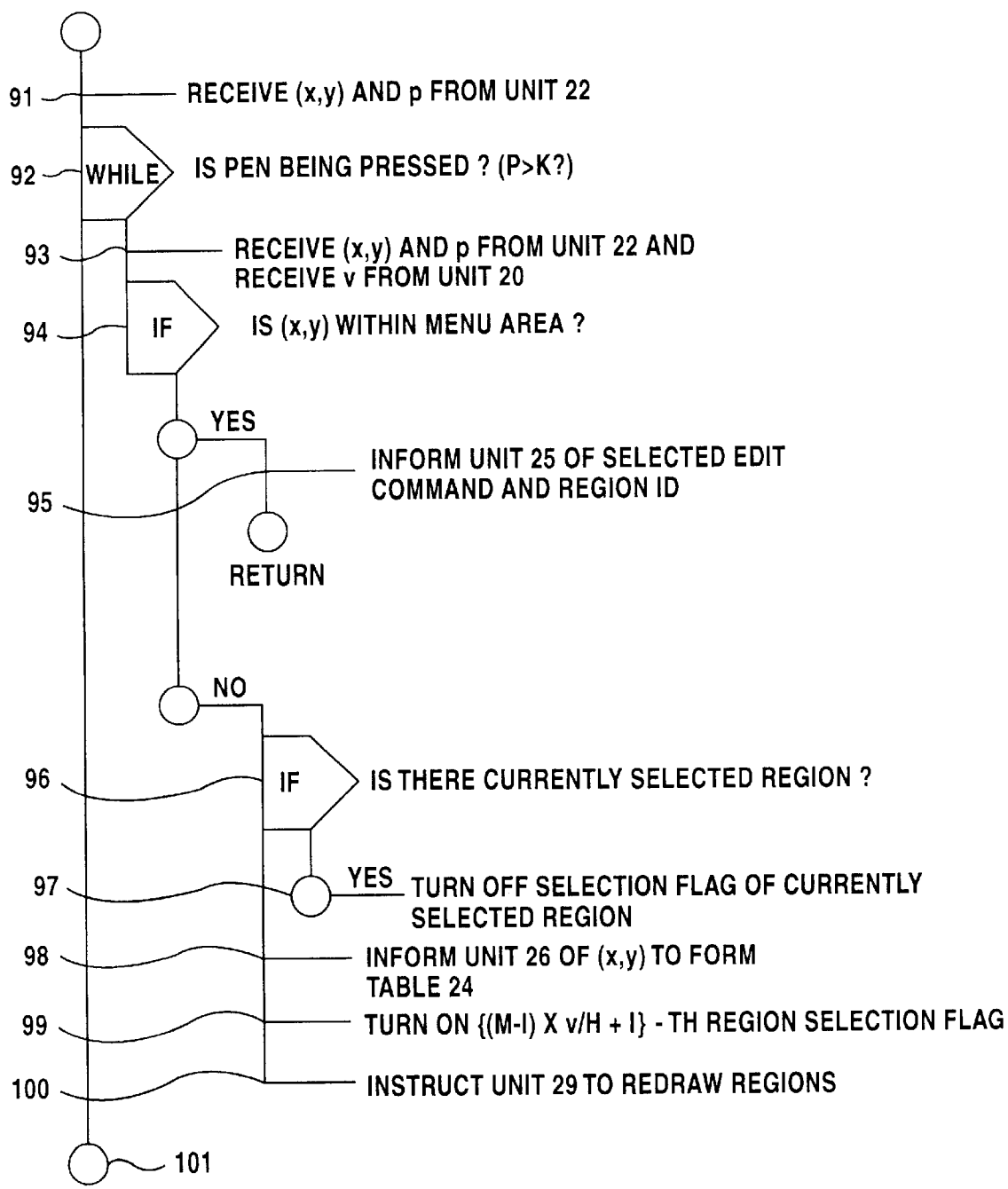

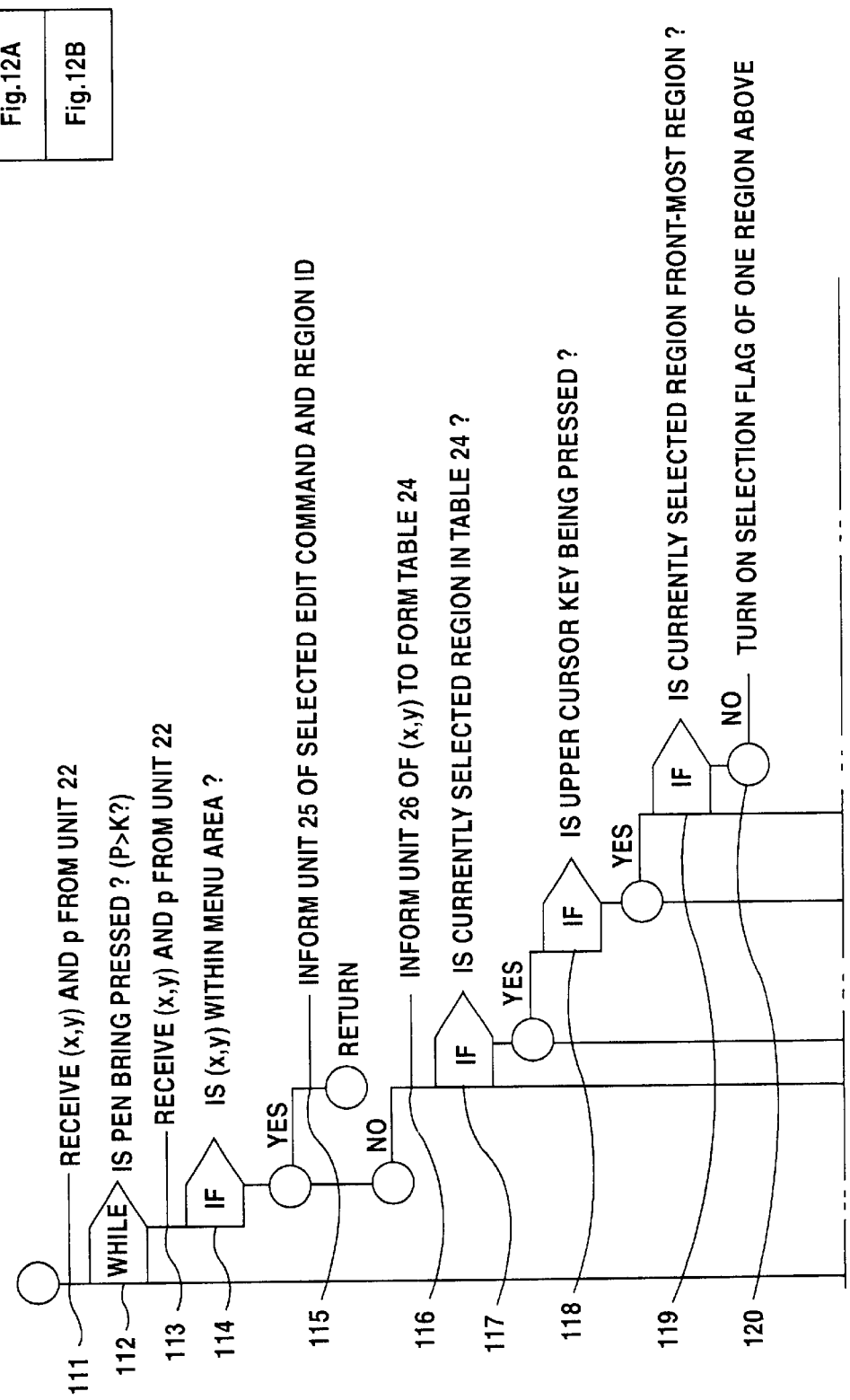

MOVE PEN IN RIGHT, LEFT, UPPER, OR LOWER DIRECTION WHILE IT IS PRESSED

Fig.14

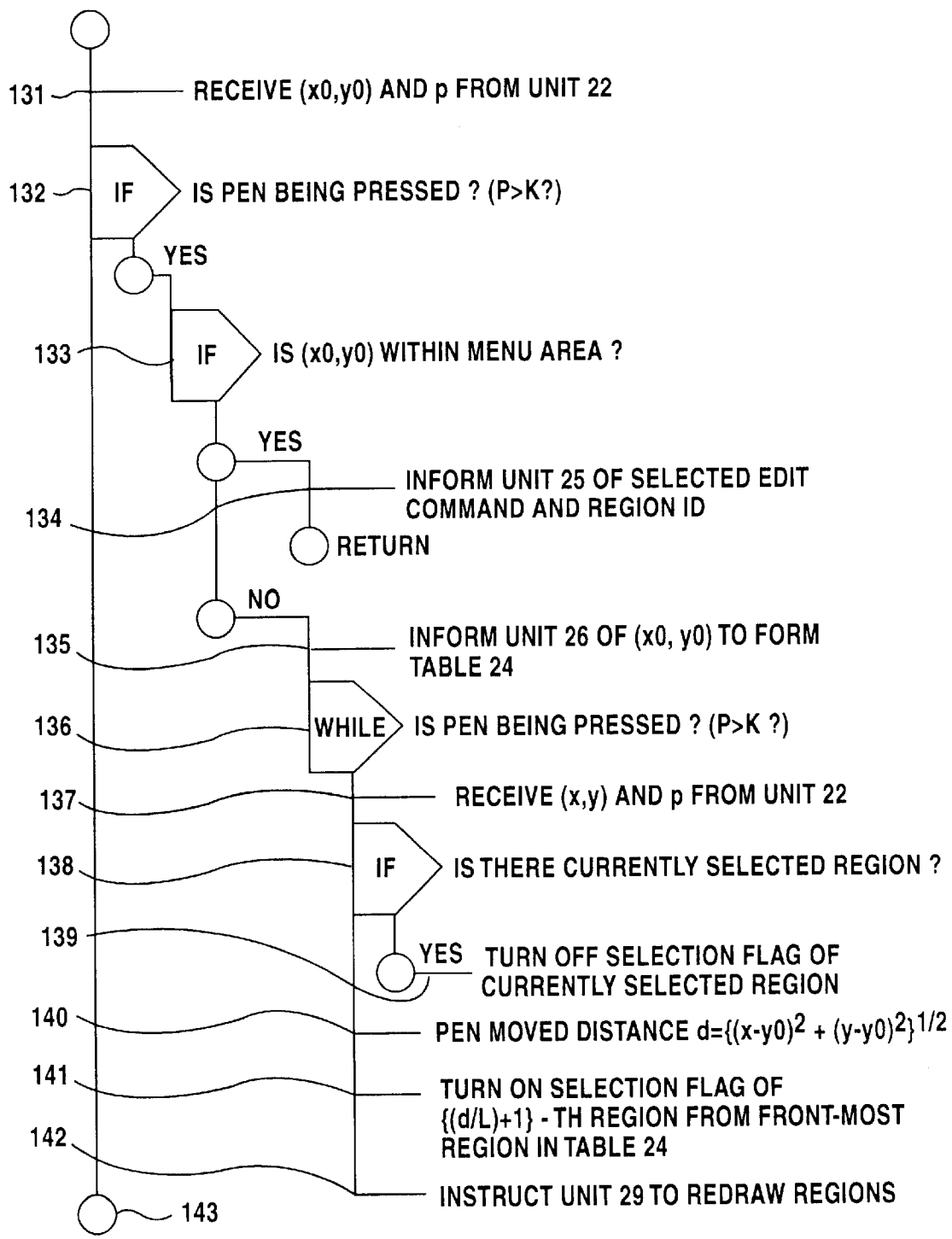

- 131 — RECEIVE (x0,y0) AND p FROM UNIT 22
- 132 — IF IS PEN BEING PRESSED ? (P>K?)
  - YES
- 133 — IF IS (x0,y0) WITHIN MENU AREA ?
  - YES
- 134 — INFORM UNIT 25 OF SELECTED EDIT COMMAND AND REGION ID
  - RETURN
  - NO
- 135 — INFORM UNIT 26 OF (x0, y0) TO FORM TABLE 24
- 136 — WHILE IS PEN BEING PRESSED ? (P>K ?)
- 137 — RECEIVE (x,y) AND p FROM UNIT 22
- 138 — IF IS THERE CURRENTLY SELECTED REGION ?
  - YES TURN OFF SELECTION FLAG OF CURRENTLY SELECTED REGION
- 139 — 
- 140 — PEN MOVED DISTANCE $d=\{(x-y0)^2 + (y-y0)^2\}^{1/2}$
- 141 — TURN ON SELECTION FLAG OF $\{(d/L)+1\}$-TH REGION FROM FRONT-MOST REGION IN TABLE 24
- 142 — INSTRUCT UNIT 29 TO REDRAW REGIONS
- 143

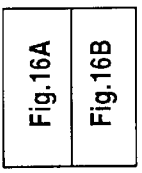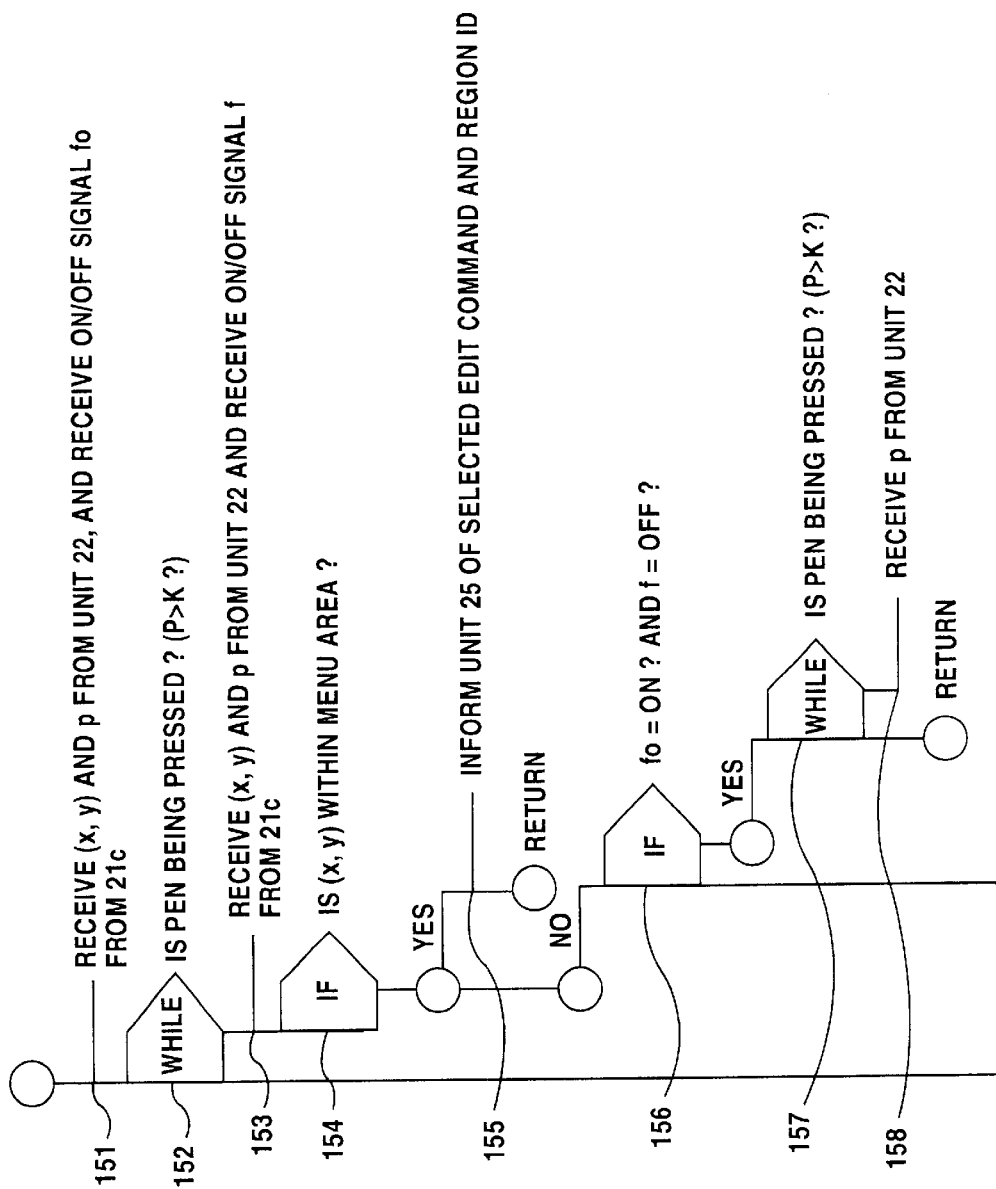

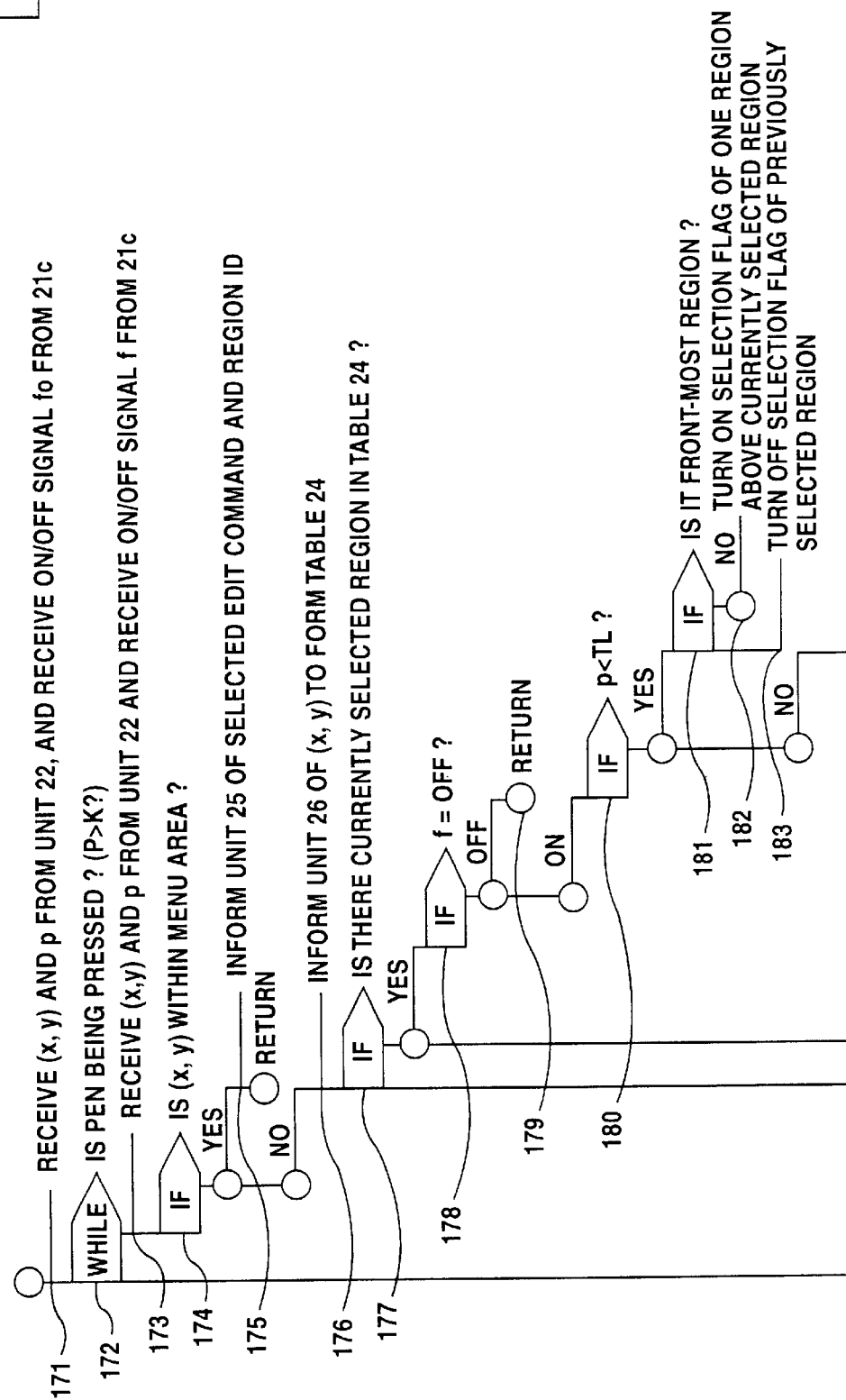

DESIRED REGION SPECIFYING SYSTEM IN AN IMAGE EDITING APPARATUS

This application is a continuation of application Ser. No. 07/992,967 filed Dec. 11, 1992, now abandoned.

BACKGROUND OF THE INVENTION (1) Field of the Invention

The present invention relates to a desired region specifying system in an image editing apparatus for editing image information such as picture information or character information displayed on a CRT, and more particularly relates to a system using painting software, a system using drawing software, or a window system for specifying desired region from among overlapped regions on the CRT.

(2) Description of the Related Art

As prior art published before the present invention, Japanese Patent Publication (Kokai) No. 63-14229, laid open to public on Jan. 21, 1988, is known.

In recent years, the cost of personal computers has decreased and the performance of personal computers has been improved so that operations involving computer graphics and animation have been simplified.

In an image editing apparatus for drawing a picture by a computer, persons or objects are drawn as transparent images, and the images are overlapped to form one picture, taking the transparency of each image into account.

To do this, it is necessary to specify one region on a display screen an a desired region from among a plurality of overlapping regions on the display screen, to edit or correct that desired region, and this operation must be repeated frequently.

Conventionally, to specify one desired region from among a plurality of regions, the other regions must be removed step by step from the display screen by moving the regions. This removing operation is complex.

SUMMARY OF THE INVENTION

Therefore, an object of the present invention is to provide a desired region specifying system in an image editing apparatus by which a desired region can be easily specified from among a plurality of overlapping regions on a display screen.

To attain the above object, there is provided, according to the present invention, the desired region specifying system in an image editing apparatus comprising a position information generating unit for generating position information on a display; a region selecting information generating unit for generating region selecting information to select desired region from among a plurality of overlapping regions; a region management table for storing positions of the regions to be displayed, the upper and lower relationships among the regions, and displaying methods for displaying the regions; a region selecting unit for selecting, based on the position information generated by the position information generating unit and the region selecting information generated by the region selecting information generating unit, the desired region to be edited from among the plurality of regions; a data storage for storing data to be displayed on a display unit; and a display control unit for reading the data stored in the data storage, and for displaying the data stored in the data storage in accordance with the displaying methods stored in the region managing table. According to the present invention, the region selecting information generating unit includes an analog signal generating unit for generating an analog signal. The analog signal is used to select the regions from overlapping region.

In one aspect of the present invention, the analog signal generating unit comprises a switch, the analog signal being generated during an ON period of the switch, and the analog signal being stopped by turning OFF the switch.

In the above system, the switch is a push button switch having a push button. The push button switch is turned ON by pressing the push button, and is turned OFF by releasing the push button. The overlapping regions are sequentially selected during an ON period of the push button switch. The desired region is specified by turning OFF the push button switch.

In the above system, the position information generating unit comprises the push button switch so as to be able to handle both the push button switch and the position information generating unit in one hand.

According to another aspect of the present invention, the analog signal generating unit comprises a pressure sensors. In this aspect, the analog signal in generated while a pressure greater than a threshold value is applied to the pressure sensor, and the analog signal is stopped by removing the pressure.

In the above system, the overlapping regions are sequentially selected while the pressure is applied to the pressure sensor, and the desired region is specified by removing the pressure from the pressure sensor.

In the above system, the position information generating unit comprises the pressure sensor so as to be able to operate the pressure sensor and the position information generating unit in one hand.

According to still another aspect of the present invention, the analog signal generating unit comprises an amplifier for generating the analog signal, the amplifier comprises a control knob for adjusting the amplitude of the analog signal, and the desired region in specified in response to the amplitude of the analog signal.

In the above system, the desired region is specified by controlling the control knob so that the amplitude of the analog signal is not changed.

According to still another aspect of the present invention, the system further comprises a switch for starting and stopping the operation of the selection of the regions.

In the above system, the desired region is specified by turning OFF the switch.

In the above system, the switch is a pressure sensor provided in the position information generating unit. The switch in turned ON when a pressure applied to the pressure sensor exceeds a predetermined threshold value.

According to still further aspect of the present invention, the analog signal generating unit comprises a pressure sensor for providing the analog signal and a switch, the amplitude the analog signal in changed in response to a pressure applied to the pressure sensor, and the desired region is specified by turning OFF the switch.

In the above system, the switch is a push button switch having a push button, and the position information generating unit comprises the pressure sensor and the push button switch so as to be able to operate the pressure sensor, the push button switch, and the position information generating unit in one hand, the regions are selected in response to a pressure applied to the pressure sensor while the switch is turned ON by holding down the push button, and the desired region is specified by releasing the push button.

According to still further aspect of the present invention, the analog signal generating unit comprises a first switch and a second switch, front regions are sequentially selected during an ON period of the first switch, and the desired region is specified by turning OFF the first switch; and rear regions are sequentially selected during an ON period of the second switch, and the desired region is specified by turning OFF the second switch.

The above system further comprises a discrete operation mode selecting unit for selecting a discrete mode in which the selection of the regions is changed from the currently selected region to one region adjacent to the currently selected region by turning ON the first or the second switch so that the regions are sequentially selected by sequentially turning ON the first switch or the second switch.

According to still further aspect of the present invention, the analog signal generating unit comprises a travel distance outputting unit and a switch, the travel distance outputting unit is provided in the position information generating unit, for outputting a travel distance between positioned designated by the position information generating unit, the regions are directly selected in response to travel distance between the initial position and the final position designated by the position information generating unit during an ON period of the switch.

In the above system, the switch in a pressure sensor provided in the position information generating unit, for generating a signal representing the ON period when a pressure larger than a threshold value in applied to the pressure sensors In the above system, the desired region is specified by removing the pressure from the pressure sensor.

Instead of the pressure sensor, the switch may be a push button switch having a push button provided in the position information generating unit, for generating a signal representing the ON period when the push button in pressed.

In the above system, the desired region is specified by releasing the push button.

According to still further aspect of the present invention, the position information generating unit comprises the pressure sensor and a switch, the regions are selected in response to the pressure applied to the pressure sensor, and the desired region is specified in response to the operation of the switch.

In the above system, when the output of the pressure sensor is increased to be larger than a first threshold, a front region adjacent to the region currently selected in selected, and when the output of the pressure sensor is decreased to be smaller than a second threshold value, a rear region adjacent to the region currently is selected.

Alternatively, when the output of the pressure sensor in increased to be larger than a first threshold value, a rear region adjacent to the region currently selected may b selected, and when the output of the pressure sensor is decreased to be smaller than a second threshold, a front region adjacent to the region currently selected may be selected.

In operation of the above systems, when a position of a region to be selected is indicated by the position information generating unit, the position information is given to the region selecting unit. The region selecting unit searches the region management table to find all regions existing at the indicated position. The regions found are stored in a table in the order from the lower region to the upper region. The display control unit reads, from the data storage, the image data of the regions designated by the region management table, in accordance with the positions and attribute information of the regions, and displays them on the display unit.

In response to the analog signal generated by the analog signal generating unit, the regions are sequentially selected. By changing the attribute information of a region in the region management table, the display of the region is highlighted or the color of the displayed region is reversed to indicate that the region is now selected. If the selected region is a desired region, the selected region is specified as a desired region by changing the state of the analog signal.

Then a user can edit or correct figures in the specified region or to add new figures to the specified region.

When the analog signal generating unit comprises a switch, the regions are sequentially selected region by region, from the front-most region to the rear-most region, during an ON period of the switch, and a desired region can be specified by turning OFF the switch.

When the analog signal generating unit comprises a pressure sensor, the regions are sequentially selected region by region, from the front-most region to the rear-most region, during a pressure is applied to the pressure senor, and a desired region can be specified by removing the pressure from the pressure sensor.

When the analog signal generating unit comprises an amplifier having a control knob for adjusting the amplitude of the analog signal, a desired region can be specified in response to the amplitude of the analog signal.

Instead of using the amplitude of the analog signal for specifying a desired region, a switch way also be used.

When the analog signal generating unit comprises a pressure sensor and a switch, the regions are sequentially selected region by region, from the front-most region to the rear-most region, in response to a pressure applied to the pressure sensor, and a desired region can be specified by turning OFF the switch.

When the region selecting information generating unit is constructed by the first and the second switch, one region above the currently selected region can be selected by pressing the first switch, and one region below the currently selected region can be selected by pressing the second switch. By repeating this operation, a desired region can be specified from among the overlapping regions.

Alternatively, a desired region can be specified by moving the position indicated by the position information generating unit while the switch on the region selecting information generating unit is ON or the output of the pressure sensor is larger than a threshold value.

The regions can also be selected by changing the output of the pressure sensor and the desired region can be specified by turning ON the switch. In this case, it is also possible to select a region one region above the currently selected region by increasing the pressure applied to the pressure sensor to be larger than the first threshold, and to select a region one region below the currently selected region by decreasing the pressure applied to the pressure sensor to be lower than the second threshold.

BRIEF DESCRIPTION OF THE DRAWINGS

The above object and features of the present invention will be more apparent from the following description of the preferred embodiments with reference to the drawings, wherein:

FIG. 3 shows an example of the contents of the region management table 27 in FIG. 1;

FIG. 4 is a table showing the contents of each parameter in the region management table 27;

FIG. 5 shows an example of the contents of the search result table 24;

Figure 8:
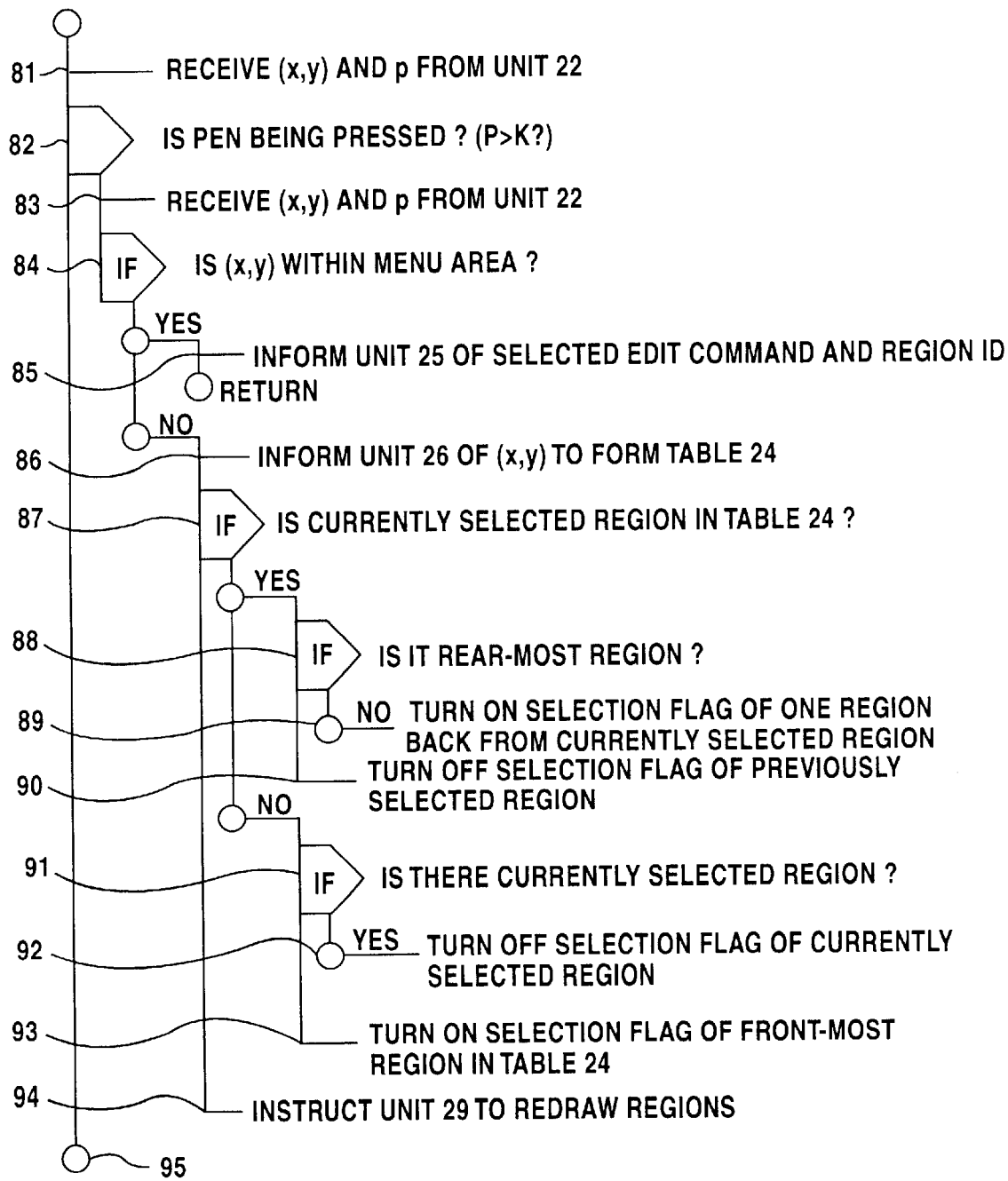
Figure 9A:
Figure 9B:
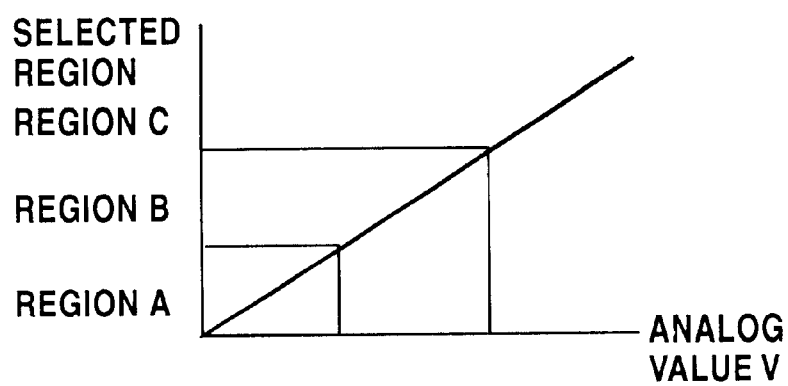
Figure 11:
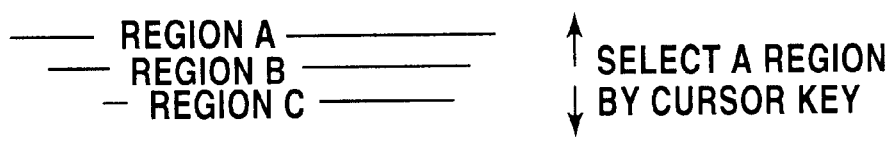
Figure 12B:
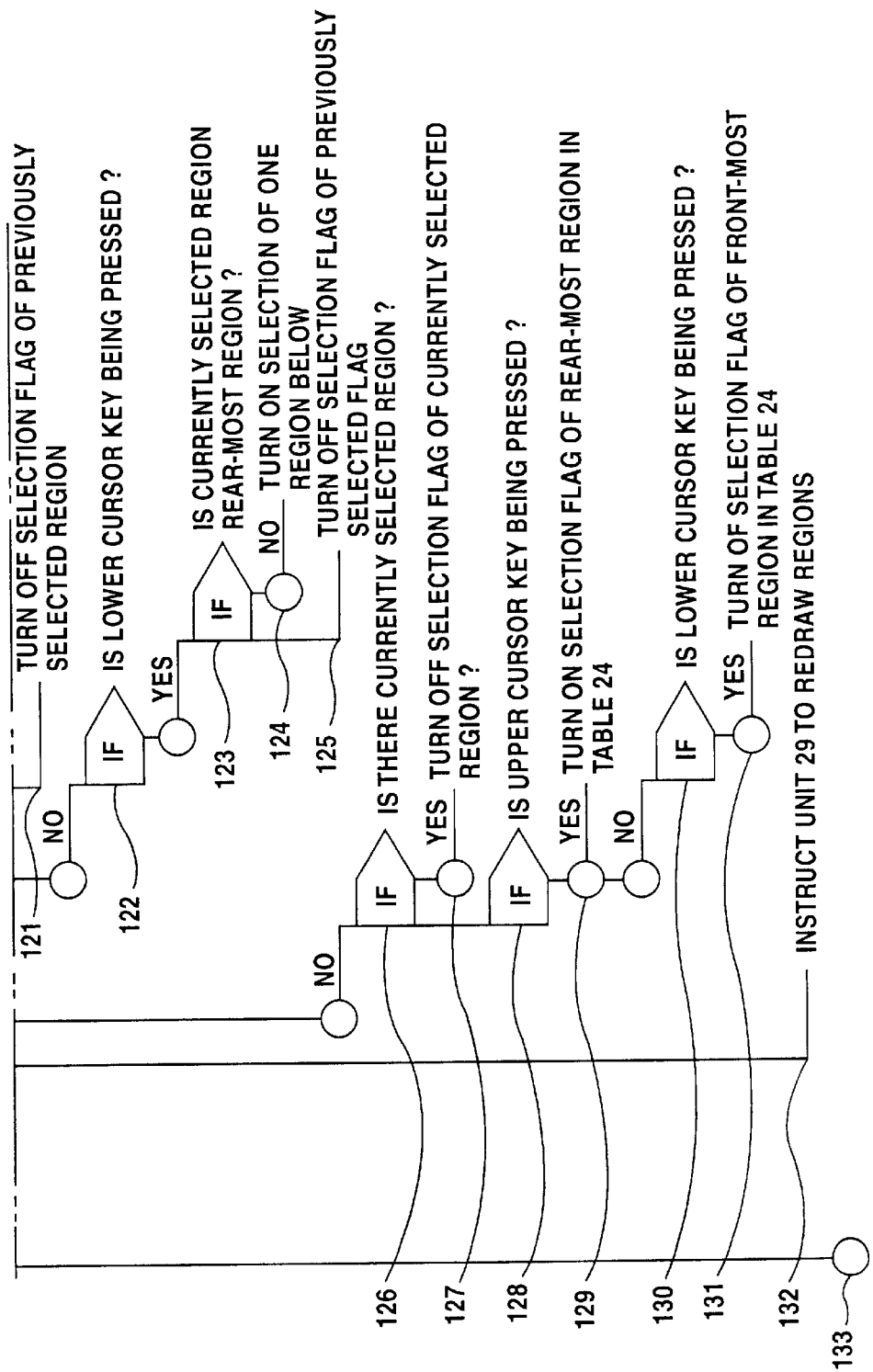
Figure 13A:
Figure 13B:
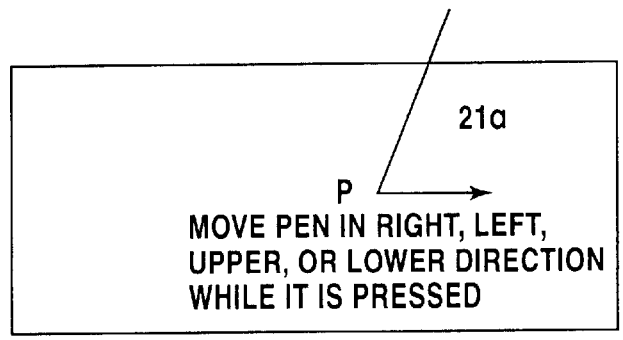
Figure 13C:
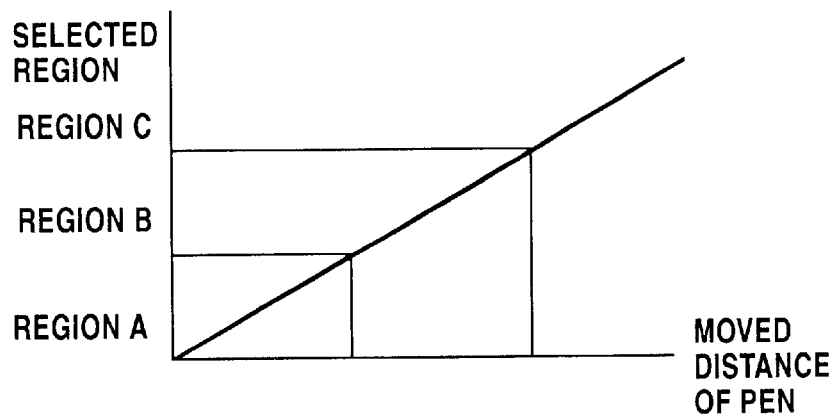
Figure 15A:
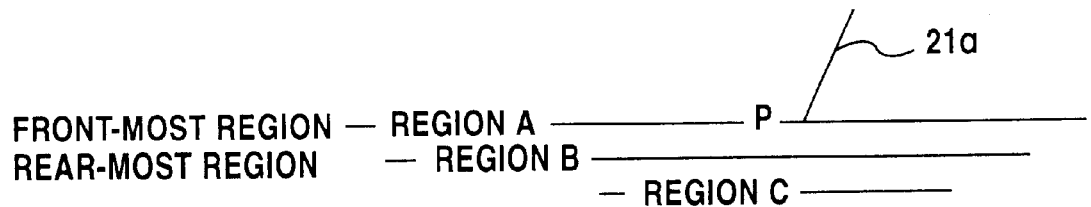
Figure 15B:
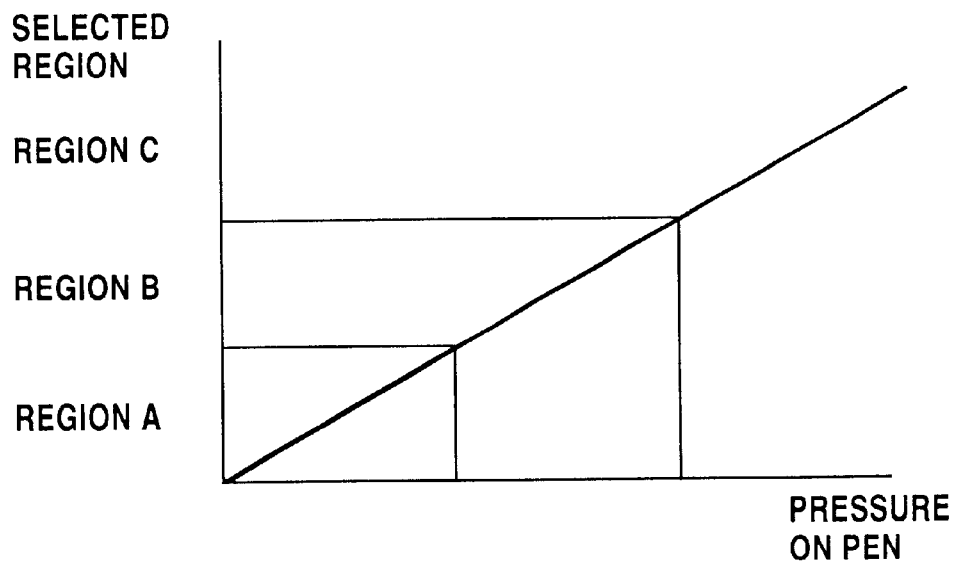
Figure 16B:
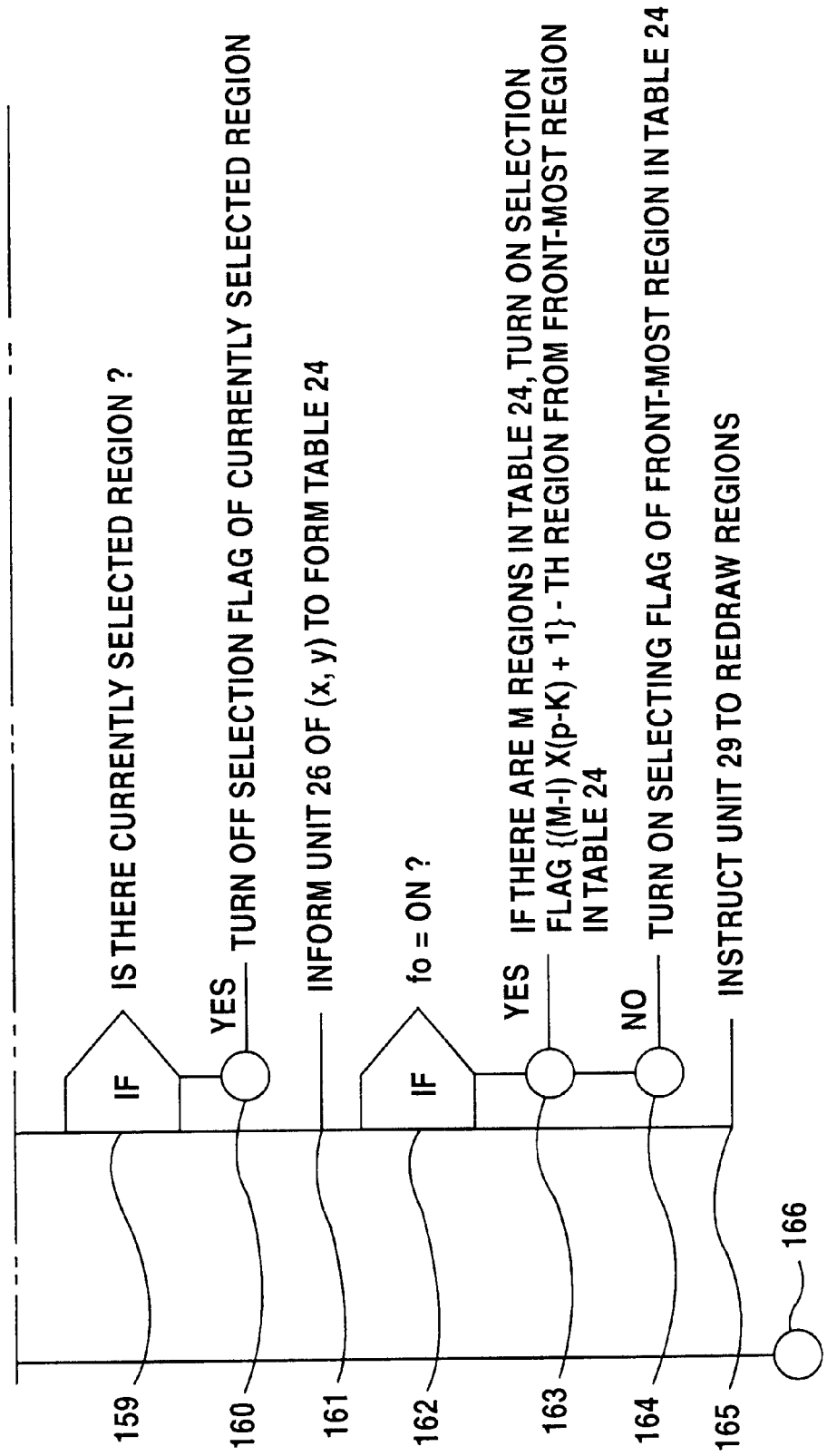
Figure 17A:
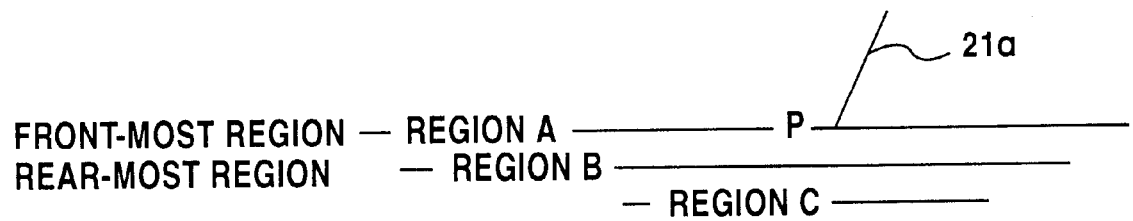
Figure 17B:
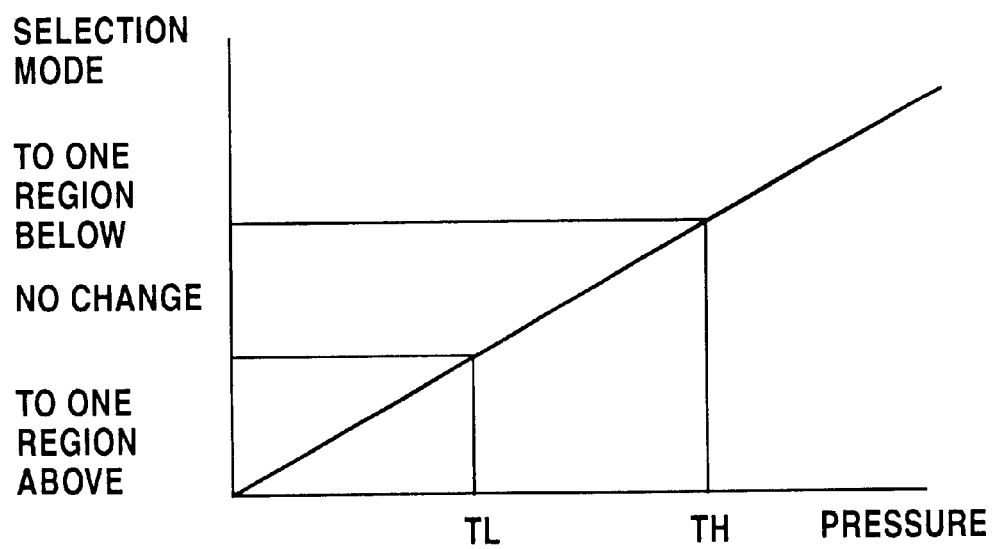
Figure 18B:
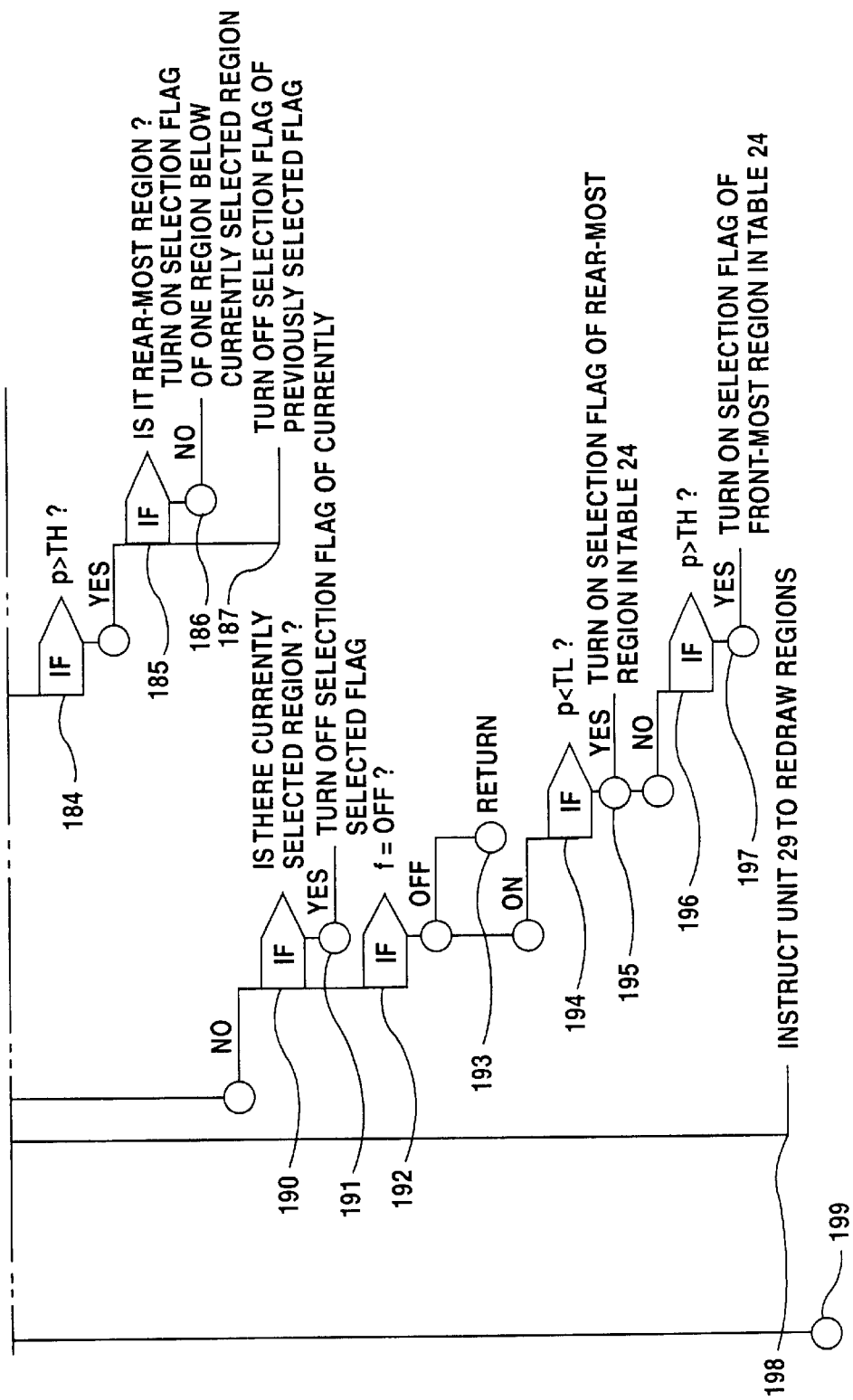

FIG, 6 is a flowchart explaining the operation of the edit processing unit 25 in FIG. 1;

FIGS. 7A and 7B are diagrams explaining a first embodiment of the present invention;

FIG. 8 is a flowchart explaining the operation of the first embodiment of the present invention;

FIGS. 9A and 9B are diagrams explaining a second embodiment of the present invention;

FIG. 10 is a flowchart explaining the operation of the second embodiment of the present invention;

FIG. 11 is a diagram explaining a third embodiment of the present inventions;

FIG. 12, consisting of FIGS. 12A and 12B is a flowchart explaining the operation of the third embodiment of the present invention;

FIGS. 13A, 13B and 13C are diagrams explaining the fourth embodiment of the present invention;

FIG. 14 is a flowchart explaining the operation of the fourth embodiment;

FIGS. 15A and 15B are diagrams explaining the fifth embodiment of the present invention;

FIG. 16, consisting of FIGS. 16A and 16B is a flowchart explaining the fifth embodiment of the present invention;

FIGS. 17A and 17B are diagrams explaining the sixth embodiment of the present invention; and FIG. 18, consisting of FIGS. 18A and 18B is a flowchart explaining the operation of the sixth embodiment.

DESCRIPTION OF THE PREFERRED EMBODIMENTS

Figure 1A:
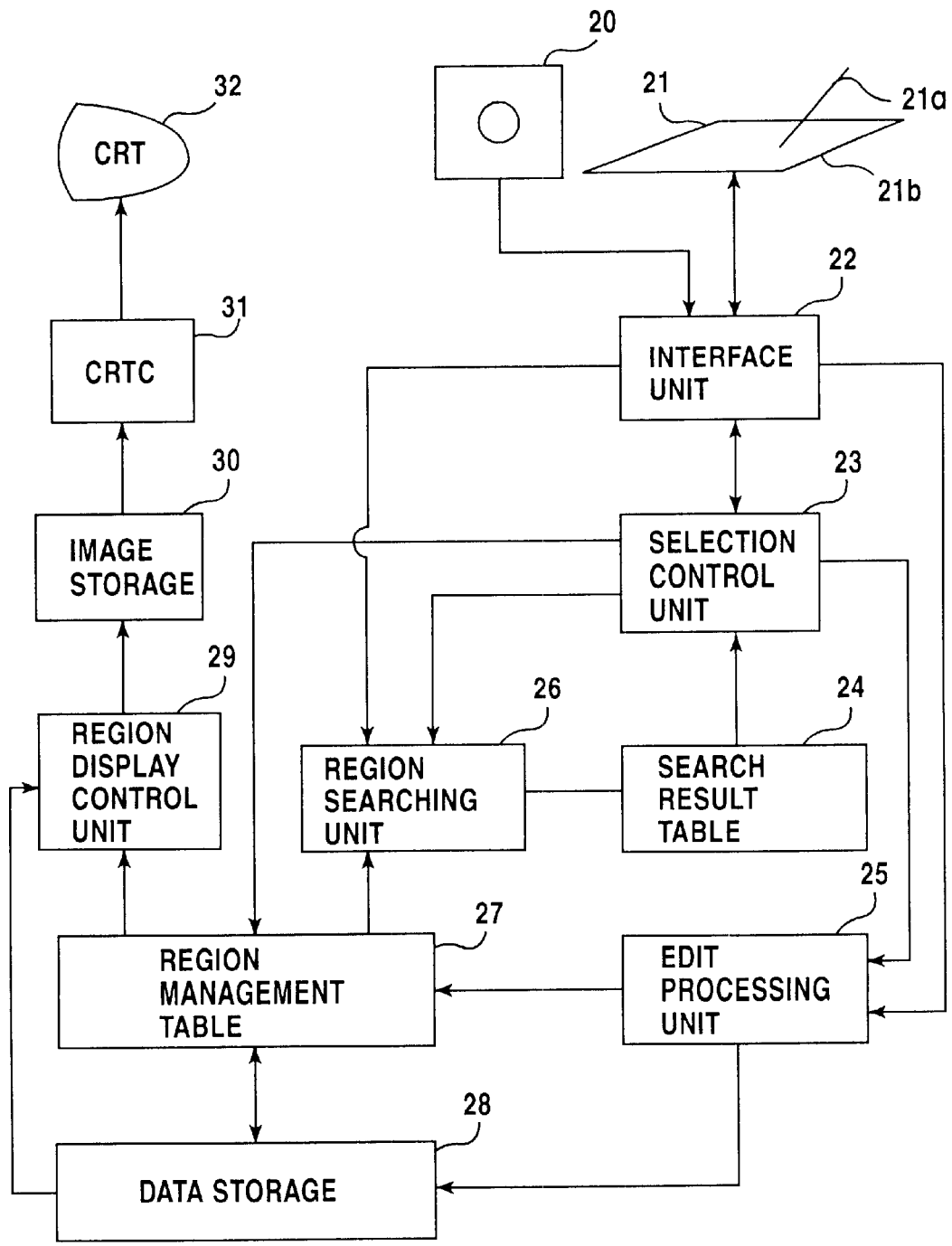
FIG. 1A is a block diagram of a desired region specifying system according to an embodiment of the present invention.

FIG. 1A is a block diagram showing a desired region specifying system according to an embodiment of the present invention. In FIG. 1A, 20 is an analog signal generating unit, 21 is a position information generating unit such as a digitizer, 21a is a pen such as a stylus pen, 21b is a digitizing tablet, 22 is an interface unit for controlling the position information generating unit 21, 23 is a selection control unit, 24 is a search result table, 25 is an edit processing unit, 26 is a region searching unit, 27 is a region management table, 28 is a data storage, 29 is a region display control unit, 30 is an image storage, 31 is a control unit for controlling a display unit 32 such as a CRT.

According to the embodiment of the present invention, the selection control unit 23, the search result table 24, the edit processing unit 25, and the region searching unit 26 are provided.

The position information generating unit 21 comprises means for generating X and Y coordinates of a region designated by a user on the display screen, and region selecting information generating means for generating information to select a region.

Figure 1B:
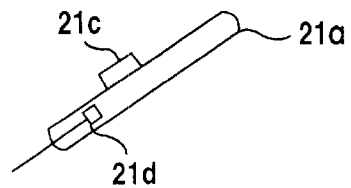
FIG. 1B is a diagram showing a stylus pen used in an embodiment of the present invention.

As the position information generating means, the stylus pen 21a is used. The stylus pen 21a is provided with, as shown in FIG. 1B a push button switch 21c on the side surface thereof and a pressure sensor 21d for measuring the pressure when the stylus pen 21a is used to draw figures. Alternatively, a mouse having a switch and a pressure sensor on the side surface thereof may be used an the position information generating means.

To obtain the region selecting information, the push button switch 21c and the pressure while the pen 21a is used are used, or the switch and the pressure sensor provided on the side surface of the mouse are used.

Instead of the pressure sensor 21d, the analog signal generating unit 20 may be used. The analog signal generating unit 20 includes in amplifier and a control knob for adjusting the amplitude of the analog signal. In this case, the amplitude of the analog signal may be changed to select regions and to specify a desired region.

Instead of the switch 21c, any key on a keyboard may be used to select regions and to specify a desired region.

In the following embodiments, the stylus pen 21a and the tablet 21 are used an the position information generating means, however, a mouse can also be used. The switch provided on the surface of the mouse corresponds to the push button switch 21c provided on the side surface of the stylus pen, and the pressure sensor provided on the side surface of the mouse corresponds to the pressure sensor 21d provided in the stylus pen 21a.

The interface unit 22 is constructed by, for example, a communication adapter, to control the position information generating unit 21, to output the received coordinate values to the selection control unit 23, and to inform the edit processing unit 25 of the pressure information generated from the pressure sensor 21d, the ON/OFF information of the switch 21c, and the region selecting information.

The selection control unit 23 selects, in accordance with the position information and the region selecting information from the interface unit 22, one of the regions stored in the search result table 24, and changes the attribute of the displaying method in the region management table 27 to highlight or reverse so as to be able to identify the selected region. Further, the selection control unit 23 informs the edit processing unit 25 of a desired region which is specified from among the existing overlapping regions in accordance with the ON/OFF information from the interface unit 22.

The edit processing unit 25 updates the contents stored in the data storage 28 based on the coordinate values and the image data selecting information from the interface unit 22.

The data storage 28 stores, in the same way as in the conventional art, image data at the addresses designated by the region management table 27.

The region management table 27 manages and stores, in the same way as in the conventional art, the attribute information of the X and Y coordinate values indicating the display positions of all regions regardless of whether these regions are currently being displayed, the addresses of the image data stored in the data storage 28, the upper or lower relationship of the regions on the display screen, the degree of transparency of the regions, the indication of whether or not the region is highlighted, and so forth.

The operation of the region display control unit 29 is the same as those available in the conventional art. Namely, the region display control unit 29 reads the data from the data storage 28, the data being designated by the region management table 27 by means of a direct-memory accessing (DMA) and so forth, and transfers the read data to the address of the image storage 30 designated by the region management table 27 in accordance with attributes such as the X and Y coordinate values, the degree of transparency, and so forth specified by the region management table 27.

The image storage 30 is the same as those available in the conventional art. Namely, the image storage 30 is constructed by, for example, a dual port RAM, and stores the contents to be displayed on the image displaying unit 32.

The image displaying unit control unit 31 reads the contents of the image storage 30 and displays those contents on the image displaying unit 32, such as a CRT.

Figure 2:
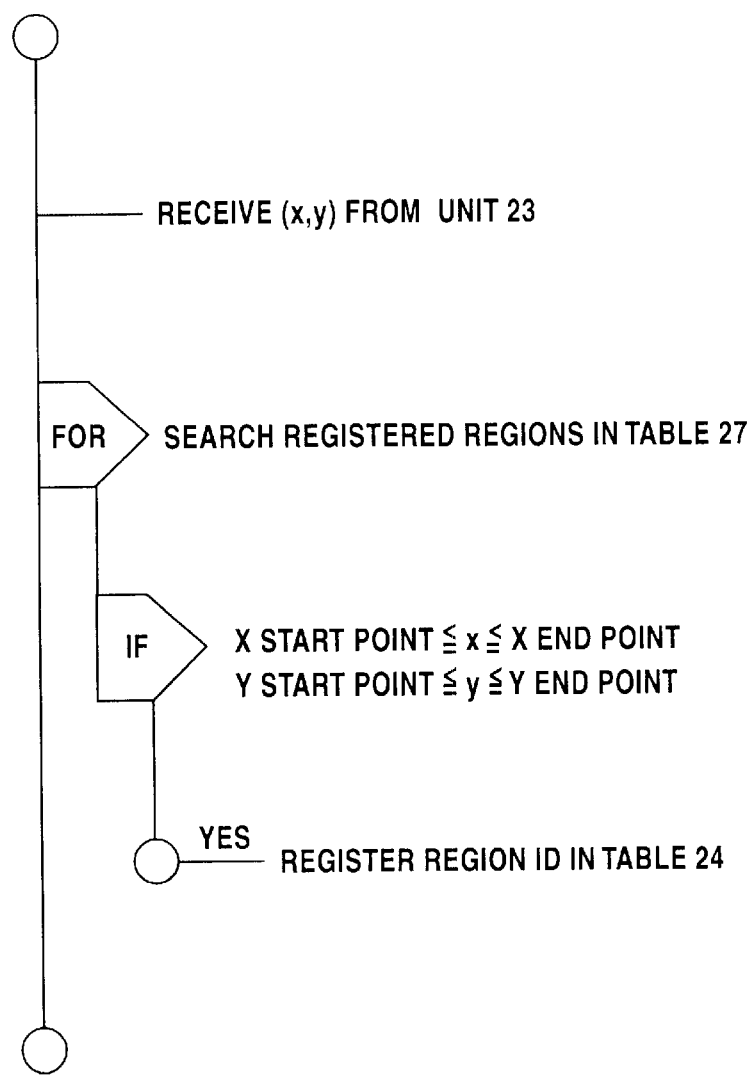
FIG. 2 is a flowchart explaining the operation of the region searching unit 26 in FIG. 1.

FIG. 2 is a flowchart explaining the operation of the region searching unit 26 in the system shown in FIG. 1. As shown in FIG. 2, the region searching unit 26 receives, at step 201, a position (x,y) from tho selection control unit 23, and sequentially searches, at step 202, regions registered in the region management table 27 from the rear-most region. At step 203, if the given position (x,y) is within the displayed range between an X start point and an X end point and between a Y start point and a Y end point, the region including the given position (x,y) is registered with an identification (ID) number in the search result table 24.

FIG. 3 shows an example of the contents of the region management table 27. In FIG. 3, the table 27 includes parameters of N regions with ID numbers from 1 to N. The region of the ID number 1 is the rear-most region, and the region of the ID number N to the front-most region. The parameters of the regions are stored in sequence from the rear-most region to the front-most region.

FIG. 4 shows details of the parameters for one region in the region management table 27.

FIG. 5 shows an example of the contents of the search result table 24 in which the ID numbers of the regions respectively including positions an the display screen are stored. In FIG. 5, the number of the regions in the search result table 24 in this case is N. The ID numbers from 2 to X are stored in sequence from the rear-most region to the front-most region.

Figure 6:
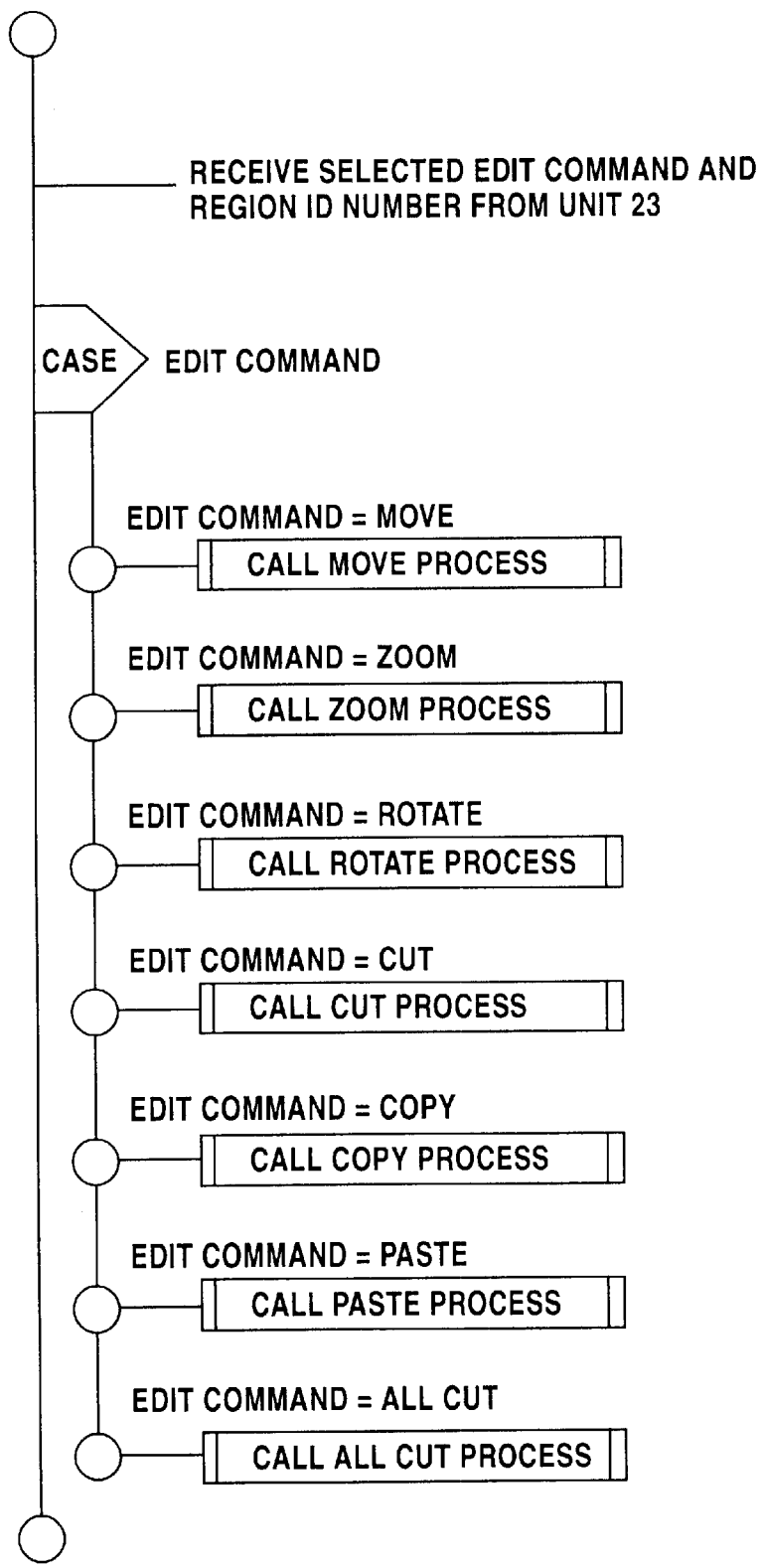

FIG. 6 is a flowchart explaining the operation of the edit processing unit 25. As shown in FIG. 6, the edit processing unit 25 receives, at step 61, an ID number of a selected region and an edit command from the selection control unit 23, and, at step 62, in accordance with the edit command, a MOVE process, a ZOOM process, a ROTATE process, a CUT process, a COPY process, a PASTE process, or an ALL CUT process is called.

FIG. 7A and FIG. 7B are diagrams showing a first embodiment of the present invention. In these figures, when a user uses the stylus pen 21a to designate a position in a region A, the position information is given through the interface unit 22 to the region searching unit 26 (at step 81).

The region searching unit 26 searches the region management table 27 to find all of the regions which are present at the indicated position. The result of the search is stored in the search result table 24 in the sequence from the rear-most region to the front-most region as shown in FIG. 5.

The region displaying unit 29 reads, based on the position and the attributes of the region designated by the region management table 27, the image data of the region from the data storage 28 and transfers the read data to the image storage 30 to display the image data.

Here, when the user presses the stylus pen 21a against, for example, the displaying screen with a certain strength, the selection control unit 23 continuously selects regions in the search result table 24 below the currently selected region.

For example, as shown in FIG. 7B, in a non-selected state in which no region in selected, when the stylus pen 21 is pressed for a while against the display screen, the region A is selected. When the stylus pen is continuously pressed for more longer time, the region B is selected.

Thus, when the stylus pen 21a is pressed with a pressure higher than a threshold value until a desired region is selected, the selected region is switched in the sequence from the non-selected state to the region A, from the region A to the region B, from the region B to the region C, or from the region C to the non-selected state.

When a region is selected, the selection control unit 23 modifies the attribute information of the selected region in the region management table 27 to highlight or reverse the selected region so as to be able to identify the selected region on the display screen 32. The selected region in informed to the edit processing unit 25.

As described above, in the first embodiment, any region among overlapping regions can be freely selected in accordance with the time period when the stylus pen 21a is pressed with a pressure higher than a threshold value, so that the operability is improved.

FIG. 8 is a flowchart explaining the operation of the selection control unit 23 according to the first embodiment of the present invention. In FIG. 8, at step 81, the selection control unit 23 initially receives the position (x,y) and a pressure p of the stylus pen 21a from the interface unit 22. From steps 82 to 94 are repeated as long as the stylus pen 21a is pressed with a certain pressure higher than the threshold value X. At step 82, it is judged whether the pressure p in higher than a threshold value k. If so, at step 82, the selection control unit 23 again receives the position (x, y) and a pressure p of the stylus pen 21a from the interface unit 22. Then, a judgement is made at step 84 whether or not the position (x,y) of the stylus pen 21a is within a menu area. If the stylus pen is pressed on the menu area, this means that the region selection operation in finished and the process should proceed to the edit process. Therefore, if the decision in the judgement at step 84 is YES, then at step 85, the selected edit command and the region ID are informed to the edit processing unit 25 and the process returns to the step 95. If the decision of the judgement at step 84 is NO, the region selection control is carried out. Namely, at step 86, the position (x,y) is informed to the region searching unit 26 to form a search result table 24. Then, at step 87, it is judged whether or not the currently selected region is in the search result table 24. If the decision is YES, then at step 88, it is judged whether or not the currently selected region is the rear-moot region. If it is not the rear-most region, then, at step 89, a selection flag of a region one region back from the currently selected region is turned ON. Then, the selection flag of the previously selected region is turned OFF, and the process proceeds through the step 87 to step 95.

When the decision is NO as a result of the judgement at step 87, then at step 91, a judgement is made as to whether or not a currently selected region is present. If the decision is YES, then at step 92, the selection flag of the currently selected region is turned OFF, resulting in all of the regions being in a non-selected state. Then, at step 93, the selection flag of the front-most region in the search result table 24 is turned ON and the process proceeds through the step 87 to step 94.

After the judgement process at step 88 or 91 and the related operations, at step 94, the selection control unit 23 instructs the region display control unit 29 to redraw regions.

The steps 82 to 94 are repeated as long as the pen is pressed with a pressure p higher than the threshold value K. When the pressure p of the stylus pen 21a becomes lower than or equal to the threshold value K, or when the pressure on the stylus pen 21a is removed, the currently selected region is specified as a desired region at step 95.

Alternatively to use the stylus pen 21a for selecting regions and specifying the desired region, a push button switch 21c having a push button, for example, may be used. In this case, the regions are selected during an ON period of the push button switch 21c. The ON period is realized by pushing the push button of the push button switch 21c. The desired region can be specified by releasing the push button switch 21c.

FIGS. 9A and 9B are diagrams explaining the region selecting operation according to the second embodiment of the present invention. In the second embodiment, as the region selecting information generating means, the analog signal generating unit 20 is used. FIG. 9A is the same as FIG. 7A schematically showing the regions A, B and C and the stylus pen 21a. FIG. 9B shows the relation between an analog value v and the selected region A, B or C.

In operation, in the same way as in the first embodiment, when a user indicates a position in the region A of the tablet 21 for example, all of the regions at the indicated position are searched and the search results are stored in the search result table 24 in sequence from the rear-most region to the front-most region.

When the user sets the analog value to a certain value by adjusting a dial or a rotary type control knob while turning ON the push button switch 21c on the stylus pen 21a, the analog value v is supplied through the interface unit 22 to the selection control unit 23.

The selection control unit 23 selects a region A, B or C in response to the analog value v. Preferably, a region is selected in proportion to the analog value v.

The selection control unit 23 also modifies the attribute information in the region management table 27 to highlight or reverse the selected region so as to be able to identify the selected region displayed on the CRT 32, and informs the edit processing unit 25 of the selected region.

FIG. 10 is a flowchart explaining the operation of the second embodiment shown in FIGS. 9A and 9B. As shown at step 99 in FIG. 10, the $\{(M-1) \times v/H+1\}$-th region from the front-most region in the search result table in selected in response to the analog value v. The other steps in FIG. 10 are self-explanatory so that a detailed description thereof is omitted here.

FIG. 11 is a diagram explaining the third embodiment of the present invention, and FIGS. 12A and 12B are a flowchart explaining the operation of the third embodiment. In the third embodiment, a region is selected by pressing a cursor key on a keyboard. For example, by pressing an upper cursor key, a region one region above the currently selected region is selected; and by pressing a lower cursor key, a region one region below the currently selected region is selected. Thus, a desired region can be specified from among the overlapping regions.

Thus, in the second and the third embodiment, by operating a dial knob or a rotary type control knob to change the analog value v, or by pressing the upper or lower cursor key on the keyboard, any region can be selected from the overlapping regions without removing the other regions.

In FIGS. 12A and 12B, steps 111 to 116 are the same as the steps 81 to 86 shown in FIG. 8 of the first embodiment. After the step 116, it is judged at step 117 whether or not the currently selected region is in the search result table 24. If the decision is YES, then at step 118, a judgement is made as to whether or not the upper cursor key is being pressed. If so, at step 119, it is judged whether or not the currently selected region in the front-most region. If it is not the front-most region, then at step 120, the selection flag of the region one region above the currently selected region is turned ON. Regardless of the result of the decision at step 119, at step 121, the selection flag of the previously selected region is turned OFF and the process proceeds through the step 117 to step 132.

If the upper key is not being pressed at the time of the judgement at step 118, then at step 122, a judgement is made as to whether or not the lower key is being pressed. If the lower key is being pressed, then at step 123, it is judged whether or not the currently selected region is the rear-most region. If it is not the rear-most region, then at step 124, the selection flag of the region one region below the currently selected region is turned ON. Regardless of the result of the decision at step 123, at step 125, the selection flag of the currently selected region is turned OFF and the process proceeds through the step 117 to the step 132.

If the currently selected region is not present in the search result table 24, then at step 126, it is judged whether or not there is a currently selected region. If the decision is YES, then at step 127, the selection flag of the currently selected flag is turned OFF so that all regions are put in the non-selected state and the process proceeds back to the step 112. Regardless pf the result of the decision at step 126, at step 128, if the upper cursor key is being pressed, the selection flag of the rear-most region in the search result table 24 is turned ON at step 129 and the process proceeds to the step 132. If the upper cursor key in not being pressed at the step 128, then at step 130, it is judged whether or not the lower cursor key is being pressed. If the decision is YES, then at step 131, the selection flag of the front-most region in the search result table 24 is turned ON, and the process proceeds to the step 132.

At step 132, an instruction is given to the region display control unit 29 to redraw regions.

When the stylus pen 21a is moved away from the tablet 21 or the pressure p is decreased to be lower than or equal to the threshold value $K_{,,}$ the looping process is finished so that the currently selected region in specified as a desired region.

FIGS. 13A, 13B and 13C are diagrams explaining the fourth embodiment of the present invention, and FIG. 14 is a flowchart explaining the operation of the fourth embodiment. FIG. 13A in the same as FIGS. 7A. FIGS. 13B shows an operation of the stylus pen 21a for selecting a region. FIG. 13C shows the relationship between the moved distance of the stylus pen 21a and the selected region.

In operation with reference to FIGS. 13A to 13C and FIG. 14, when a user indicates a position on the region A of the tablet 21 by means of the stylus pen 21a in the same way as in the first embodiment, all of the regions at the indicated position are searched, and the searched results are stored in the search result table 24 in the sequence from the rear-most region to the front-most region.

Here, when the user moves the stylus pen 21a to change the indicating position in the horizontal direction or in the vertical direction while pressing the stylus pen 21a or keeping the push button switch 21c on the side surface of the stylus pen 21a ON, an analog value proportional to the moved distance is sent to the selection control unit 23.

The selection control unit 23 selects, as shown in FIG. 13C, a region A, B or C corresponding to the analog value.

The selection control unit 23 also modifies the attribute information in the region management table 27 to highlight or reverse the selected region so as to be able to identify the selected region displayed on the CRT 32.

When the selected region is the desired region, the user moves the stylus pen 21a away from the tablet 21b or releases the push button switch 21c so that the currently selected region is specified as the desired region, and the specified region is informed to the edit processing unit 25.

Thus, in this fourth embodiment, by moving the stylus pen 21a while pressing it or pressing the push button switch, any region among the overlapping region can be selected without removing the other regions.

FIG. 14 is a flowchart explaining the operation of the selection control unit 23 according to the fourth embodiment of the present invention. In FIG. 14, at step 131, the selection control unit 23 initially receives the starting position $(x_0,y_0)$ and a pressure p of the stylus pen 21a from the interface unit 22. At step 132, it is judged whether or not the pressure p in higher than a threshold value K, namely, whether or the stylus pen 21a is pressed. If the decision is YES, a judgement is made at step 133 whether or not the position $(x_0,y_0)$ of the stylus pen 21a is within a menu area. If the stylus pen is pressed on the menu area, this means that the region selection operation is finished and the process should go to the edit process. Therefore, if the decision in the judgement at step 133 is YES, then at step 134, the selected edit command and the region ID are informed to the edit processing unit 25 and the process is end. If the decision of the judgement at step 133 is NO, the region selection control is carried out. Namely, at step 135, the position $(x_0,y_0)$ is informed to the region searching unit 26 to form a search result table 24. Then, the following steps 136 to 142 are repeated while the stylus pen 21a is pressed with a pressure p higher than the threshold value K. At step 137, the selection control unit 23 receives the position (x,y) and a pressure p of the stylus pen 21a from the interface unit 22. Then, at step 138, it in judged whether or not there is a currently selected region. If the decision is YES, then at step 139, the selection flag of the currently selected region is turned OFF. If the decision is NO or after the step 139, at step 140 the moved distance d of the stylus pen 21a is calculated as:

$$d=\{(x-x_0)^2+(y-y_0)^2\}^{1/2}$$

Then at step 141, the selection flag of the {(d/L)+1 }-th region from the front-most region is turned ON. Then at step 142, the selection control unit 23 instructs the region display control unit 29 to redraw regions.

When the pressure p of the stylus pen 21a becomes lower than or equal to the threshold value K, or when the pressure on the stylus pen 21a is removed, the currently selected region is specified as a desired region.

FIGS. 15A and 15B are diagrams explaining the fifth embodiment of the present invention. In this embodiment, as an analog value, a pressure applied to the stylus pen 21a while figures are being drawn by the stylus pen 21a is used. FIG. 15B shows a relationship between the applied pressure on the stylus pen 21a and a selected region. As shown in FIG. 15B, by increasing the pressure applied to the stylus pen 21a to increase the pressure, the selected regions are changed from the region A through the region B to the region C. The object region is specified by releasing the push button switch 21c for example.

FIGS. 16A and 16B are a flowchart explaining the operation of the selection control unit 23 according to the fifth embodiment of the present invention. In FIGS. 16A and 16B, at step 151, the selection control unit 23 initially receives the position (x,y) and a pressure p of the stylus pen 21a from the interface unit 22, and receives an ON/OFF signal $f_1$ from the push button switch 21c. The push button switch 21c is used in this embodiment to specify the selected region as a desired region. Therefore, if the push button switch 21c in not pressed before pressing the stylus pen 21a, the fifth embodiment using the pressure of the stylus pen 21a as the analog signal cannot be carried out because the desired region cannot be specified by the switch 21c. The signal $f_1$ received at the step 151 is used in the later step to determine whether or not the push button switch 21c is pressed before the stylus pen 21a is pressed. The steps 152 to 165 are repeated as long as the stylus pen 21a is pressed with a pressure p higher than the threshold value K. At step 152, it is judged whether the pressure is higher than a threshold value K while the stylus pen 21a in being pressed. If so, at step 152, the selection control unit 23 again receives the position (x,y) and a pressure p of the stylus pen 21a from the interface unit 22, and receives the ON/OFF signal f from the switch 21c. Then, a judgement is made at step 154 whether or not the position (x,y) of the stylus pen 21a is within a menu area. If the decision is YES, then at step 155, the selection control is finished so that the selected edit command and the region ID are informed to the edit processing unit 25 and the process is end.

If the decision of the judgement at step 154 is NO, then at step 156, it is judged whether or not the signal $f_1$ is ON and the signal f is OFF. If the decision in YES, this means that the push button switch 21c is turned off by releasing the pressure on the press button so that the desired region should be specified. Therefore, steps 157 and 158 are repeated until the condition p>K while the stylus pen 21a in being pressed is no longer satisfied. When the condition is no longer satisfied, namely, when the pressure p becomes lower than or equal to the threshold value K, the selecting process is finished so that the process is end.

At step 156, if the condition $f_1$=ON and f=OFF is not satisfied, the process proceeds to step 159 at which it is judged whether or not there is a currently selected region. If the decision is YES, then at step 160, the selection flag of the currently selected region is turned OFF. Then, at step 161, the position (x,y) of the stylus pen 21a is informed to the region searching unit 26 to form the search result table 24. Then if f is ON at step 162, and if there are N regions in the search result table 24, the selection flag of the [{(M−1)×(p−K)}/(H−K)+1]-th region from the front-most region in the search result table 24 is turned ON at step 163. If $f_1$ is OFF at step 162, then at step 164, the selection flag of the front-most region in the search result table 24 is turned ON. Then, at step 165, the selection control unit 23 instructs the region display control unit 29 to redraw regions.

The steps 152 to 165 are repeated as long as the pen in pressed with the pressure p higher than the threshold value K. When the pressure p of the stylus pen 21a becomes lower than or equal to the threshold value K, or when the pressure on the stylus pen 21a is removed, the currently selected region is specified as a desired region at step 152.

Thus, in the above-described fifth embodiment, any region can also be freely selected without removing the other regions, in response to the pressure applied to the stylus pen 21a, and the desired region can be specified by turning OFF the switch.

FIGS. 17A and FIGS. 17B are diagrams for explaining the sixth embodiment of the present invention. FIG. 17A is the same as FIG. 7A, and FIG. 17B shows the relationship between a pressure and a selection mode.

In the operation of the sixth embodiment, with reference to FIGS. 17A, 17B and FIG. 18, when a user indicates a position on the region A of the tablet 21 by means of the stylus pen 21a in the same way as in the first embodiment, all of the regions at the indicated position are searched, and the searched results are stored in the search result table 24 in the sequence from the rear-most region to the front-most region.

Here, when the user presses the stylus pen 21a while pressing the push button switch 21c on the side surface of the stylus pen 21a, the ON/OFF signal and the pressure are informed through the interface unit 22 to the selection control unit 23.

In this sixth embodiment, when the pressure of the stylus pen 21a is higher than a higher threshold value TH, a region one region below the currently selected region is selected; when the pressure of the stylus pen 21a is between the higher threshold value TH and a lower threshold value TL, the selected region is not changed; and when the pressure is lower than the lower threshold value TL, a region one region above the currently selected region is selected. Alternatively, when the pressure of the stylus pen 21a is higher than a higher threshold value TH, a region one region above the currently selected region may be selected; and when the pressure is lower than the lower threshold value TL, a region one region below the currently selected region may be selected.

The selection control unit 23 also modifies the attribute information in the region management table 27 to highlight or reverse the selected region so as to be able to identify the selected region displayed on the CRT 32.

When the selected region is the desired region, the user releases the push button switch 21c so that the currently selected region is specified as the desired region, and the specified region is informed to the edit processing unit 25.

Thus, in this sixth embodiment, by changing the pressure of the stylus pen 21a while pressing the push button switch, any region among the overlapping region can be selected without removing the other regions.

FIGS. 18A and 18B are a flowchart explaining the operation of the sixth embodiment. In FIGS. 18A and 18B, the steps 171 to 175 are the same as the steps 151 to 155 in FIG. 16A. If the position (x,y) in not in the menu area, then at step 176, the position (x,y) is informed to the region searching unit 26 to form a search result table 24. Then, at step 177, it is judged whether or not there is a currently selected region in the search result table 24. If the decision is YES, then, at step 178, it is judged whether or not the switch 21c is OFF. If the switch 21c is OFF at step 178, then the process is end at step 179. If the switch 21c is ON at the step 178, then at step 180, the pressure p and the lower threshold value TL are compared. If the pressure is lower than the lower threshold value TL, the at step 181, it is judged whether or not the currently selected region is the front-most region. If the decision is not the front-most region, then at step 182, the selection flag of the region one region above the currently selected region is turned ON. Then, after the step 182 or when the currently selected region is the front-most region, at step 183, the selection flag of the previously selected region is turned OFF.

If the pressure p is higher than or equal to the lower threshold value TL at step 180, then, at step 184, the pressure is compared with the higher threshold value TH. If the pressure p is higher than the higher threshold value TH, then at step 185, it is judged whether or not the currently selected region is the rear-most region. If the decision is NO, then at step 186, the selection flag of the region one region below the currently selected region is turned ON. After the step 186 or if the currently selected region is the rear-most region, then at step 187, the selection flag of the previously selected region is turned OFF.

After the step 176, if the currently selected region is not present in the search result table 24, then at step 190, it is judged whether or not the currently selected region is present. If is is YES, then at step 191, the selection flag of the currently selected region is turned OFF. After the step 190 or if there is no currently selected region, then at step 192, it is judged whether or not the switch f is OFF. If the switch f is OFF, the process is end at step 193. If the switch f is ON at the step 192, then the pressure p is compared with the lower threshold value TL at step 194. If p is lower than TL, then at step 195, the selection flag of the rear-most region in the search result table 24 is turned ON. If p is higher than or equal to the lower threshold value TL, then at step 196, the pressure is compared with the higher threshold value TH. If p is higher than the higher threshold value TH, then at step 197, the selection flag of the front-most region in the search result table 24 to turned ON.

Each time after the step 186, 187, 195, or 197, the process proceeds to steep 198 to instruct the region display control unit 29 to redraw regions.

When the condition at step 172 is no longer satisfied, then the selected region is specified as the desired region.

In the foregoing embodiments, the push button switch 21c provided on the side surface of the stylus pen 21a is used, however, instead of the push button switch 21c, any switch such as a key on a keyboard may be employed.

In the block diagram shown in FIG. 1 alternatively to the selection control unit 23, the edit processing unit 25, the region searching unit 26, and the region display control unit 29, a processor may be employed and the functions in these units may be realized by software.

Further, the image editing apparatus in the present invention is not restricted to an apparatus for editing image information such as a graphic system, but an apparatus for editing character information displayed on a display unit may also be used.

From the foregoing description, it is apparent that, according to the present invention, any region can be easily selected from among a plurality of overlapping regions by using the pressure applied to the stylus pen or by operating a dial knob, a rotary control knob, or an upper cursor key and a lower cursor key, without the necessity to remove the other regions. Therefore, the operability of the image editing apparatus is greatly improved in comparison with the prior art.

What is claimed is:

1. A desired region specifying system in an image editing apparatus comprising:

position information generating means for generating position information including x-y coordinates of a point on a display;

region selecting information generating means for generating region selecting information to select a desired region from among a plurality of regions which overlap in said point;

a region management table for storing positions of the regions to be displayed, the upper and lower relationships among the regions, and displaying methods for displaying the regions;

region selecting means for selecting, based on the position information generated by the position information generating means and the region selecting information generated by the region selecting information generating means, a desired region to be edited from among the plurality of regions, wherein a first region overlapped by a second region at said point such that there is no visible indication of said first region is selectable by said region selecting means in a single step;

a data storage for storing data to be displayed on a display unit; and display control means for reading the data stored in the data storage, and for displaying the data stored in the data storage in accordance with the displaying methods stored in the region managing table, the region selecting information generating means including analog signal generating means for generating an analog signal, the analog signal being used to select the regions from overlapping regions.

2. A desired region specifying system as claimed in claim 1, wherein the analog signal generating means comprises a switch, the analog signal being generated during an ON period of the switch, and the analog signal being stopped by turning OFF the switch.

3. A desired region specifying system as claimed in claim 2, wherein the switch in a push button switch having a push button, the push button switch being turned ON by pressing the push button, and being turned OFF by releasing the press of the push button, the overlapping regions being sequentially selected during an ON period of the push button switch, the desired region being specified by turning OFF the push button switch.

4. A desired region specifying system an claimed in claim 3, wherein the position information generating means comprises the push button switch so as to be able to handle both the push button switch and the position information generating means in one hand.

5. A desired region specifying system as claimed in claim 1, wherein the analog signal generating means comprises a pressure sensor, the analog signal being generated while a pressure greater than a threshold value is applied to the pressure sensor, and the analog signal being stopped by removing the pressure.

6. A desired region specifying system an claimed in claim 5, wherein the overlapping regions being sequentially selected while the pressure is applied to the pressure sensor, the desired region being specified by removing the pressure from the pressure sensor.

7. A desired region specifying system an claimed in claim 6, therein the position information generating means comprises the pressure sensor so as to be able to operate the pressure sensor and the position information generating means in one hand.

8. A desired region specifying system as claimed in claim 1, wherein the analog signal generating means comprises an amplifier for generating the analog signal, the amplifier comprises a control knob for adjusting the amplitude of the analog signal, the desired region being specified in response to the amplitude of the analog signal.

9. A desired region specifying system as claimed in claim 8, wherein the desired region is specified by controlling the control knob so that the amplitude of the analog signal is not changed.

10. A desired region specifying system as claimed in claim 8 further comprises a switch for starting and stopping the operation of the selection of the regions.

11. A desired region specifying system as claimed in claim 10, wherein the desired region is specified by turning OFF the switch.

12. A desired region specifying system as claimed in claim 11, wherein the switch is a pressure sensor provided in the position information generating means, the switch being turned ON when a pressure applied to the pressure sensor exceeds a predetermined threshold value.

13. A desired region specifying system as claimed in claim 1, wherein the analog signal generating means comprises a pressure sensor for providing the analog signal and a switch, the amplitude the analog signal being changed in response to a pressure applied to the pressure sensor, the desired region being specified by turning OFF the switch.

14. A desired region specifying system as claimed in claim 13, wherein the switch in a push button switch having a push button, and the position information generating means comprises the pressure sensor and the push button switch so as to be able to operate the pressure sensor, the push button switch, and the position information generating means in one hand, the regions being selected in response to a pressure applied to the pressure sensor while the switch is turned ON by holding down the push button, and the desired region being specified by releasing the push button.

15. A desired region specifying system as claimed in claim 1, wherein the analog signal generating means comprises a first switch and a second switch, front regions being sequentially selected during an ON period of the first switch, and the desired region being specified by turning OFF the first switch; and rear regions being sequentially selected during an ON period of the second switch, and the desired region being specified by turning OFF the second switch.

16. A desired region specifying system as claimed in claim 15, further comprises discrete operation mode selecting means for selecting a discrete mode in which the selection of the regions is changed from the currently selected region to one region adjacent to the currently selected region by turning ON the first or the second switch so that the regions are sequentially selected by sequentially turning ON the first switch or the second switch.

17. A desired region specifying system as claimed in claim 1, wherein the analog signal generating means comprises travel distance outputting means and a switch, the travel distance outputting means being provided in the position information generating means, for outputting a travel distance between positions designated by the position information generating means, the regions being directly selected in response to travel distance between the initial position and the final position designated by the position information generating means during an ON period of the switch.

18. A desired region specifying system as claimed in claim 17, wherein the switch is a pressure sensor provided in the position information generating means, for generating a signal representing the ON period when a pressure larger than a threshold value is applied to the pressure sensor.

19. A desired region specifying system as claimed in claim 18, wherein the desired region is specified by removing the pressure from the pressure sensor.

20. A desired region specifying system an claimed in claim 17, wherein the switch is a push button switch having a push button provided in the position information generating means, for generating a signal representing the ON period when the push button is pressed.

21. A desired region specifying system as claimed in claim 20, wherein the desired region is specified by releasing the push button.

22. A desired region specifying system as claimed in claim 1, wherein the position information generating means comprises the pressure sensor and a switch, the regions being selected in response to the pressure applied to the pressure sensor, and the desired region being specified in response to the operation of the switch.

23. A desired region specifying system as claimed in claim 22, wherein when the output of the pressure sensor is increased to be larger than a first threshold, a front region adjacent to the region currently selected is selected, and when the output of the pressure sensor is decreased to be smaller then a second threshold value, a rear region adjacent to the region currently selected is selected.

24. A desired region specifying system as claimed in claim 22, wherein when the output of the pressure sensor is increased to be larger than a first threshold value, a rear region adjacent to the region currently selected is selected, and when the output of the pressure sensor is decreased to be smaller than a second threshold, a front region adjacent to the region currently selected is selected.

* * * * *

UNITED STATES PATENT AND TRADEMARK OFFICE
CERTIFICATE OF CORRECTION

PATENT NO.    : 6,448,959 B1
DATED         : September 10, 2002
INVENTOR(S)   : Naohisa Kawaguchi et al.

It is certified that error appears in the above-identified patent and that said Letters Patent is hereby corrected as shown below:

<u>Title page,</u>
Item [30], Foreign Application Priority Data, should read as follows:
-- Dec. 13, 1991 --

Signed and Sealed this

Fifteenth Day of April, 2003

JAMES E. ROGAN
*Director of the United States Patent and Trademark Office*